E. A. CHRISTOPH.
ELECTRIC TOASTER.
APPLICATION FILED JULY 1, 1920.

1,393,427.

Patented Oct. 11, 1921.
2 SHEETS—SHEET 1.

Inventor
Emil A. Christoph
By Brown, Boettcher & Riemer
Att'ys

E. A. CHRISTOPH.
ELECTRIC TOASTER.
APPLICATION FILED JULY 1, 1920.
1,393,427.
Patented Oct. 11, 1921.
2 SHEETS—SHEET 2.
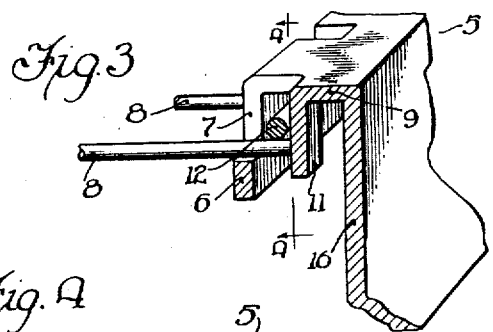
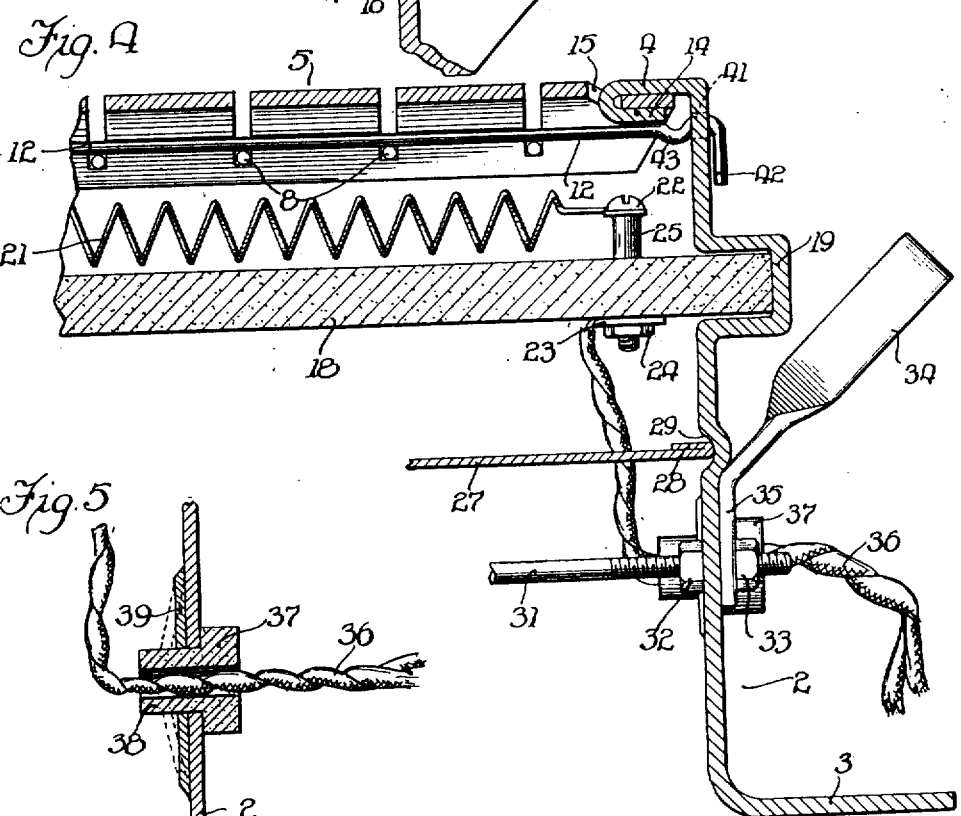
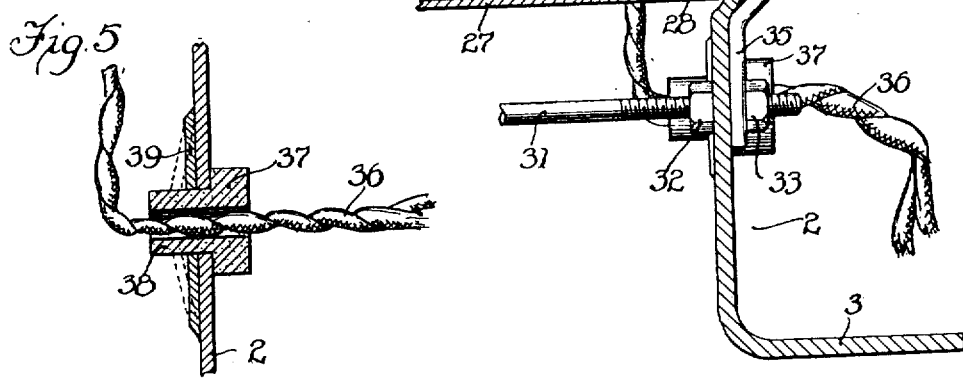
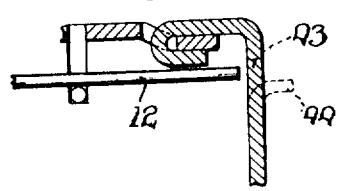
Inventor
Emil A. Christoph
By Brown, Boettcher Dieners
Att'ys

UNITED STATES PATENT OFFICE.

EMIL A. CHRISTOPH, OF CHICAGO, ILLINOIS, ASSIGNOR OF ONE-HALF TO EDWARD A. CHRISTOPH, OF CHICAGO, ILLINOIS.

ELECTRIC TOASTER.

1,393,427.   Specification of Letters Patent.   Patented Oct. 11, 1921.

Application filed July 1, 1920. Serial No. 393,392.

*To all whom it may concern:*

Be it known that I, EMIL A. CHRISTOPH, a citizen of the United States, residing at Chicago, in the county of Cook and State of Illinois, have invented a certain new and useful Improvement in Electric Toasters, of which the following is a full, clear, concise, and exact description, reference being had to the accompanying drawings, forming a part of this specification.

The present invention is directed to improvements in electric toasters, particularly of the horizontal domestic type of toaster, and has particular, though not essential reference, to improvements in the construction of this class of toasters.

One of the fundamental objects of the invention is to provide a construction of toaster which can be manufactured and sold at a minimum cost, and to this end I have devised improved features of construction residing primarily in a minimum number of structural parts, capable of ready and inexpensive assembly, the major portion of which consist of sheet metal stampings which can be turned out at the lowest possible expense.

The electrical heating elements, in practically all electric toasters are susceptible to burning out from overheating and oxidization, and it is generally a rather difficult and tedious task to replace one or more of these elements, this operation requiring in many instances the entire dismantling of the toaster. In this regard, it is a particular object of my invention to provide a construction of toaster in which the heating elements are made readily accessible for immediate and convenient substitution without necessitating any disassembly of the toaster frame.

In the accompanying drawings I have illustrated a preferred embodiment of my invention to acquaint those skilled in the art with the manner of constructing my invention. In the drawings:

Fig. 3 is a sectional view in perspective of one of the side frame members, being taken on the line 3—3 of Fig. 1;

Fig. 4 is a vertical fragmentary sectional view, taken approximately on the line 4—4 of Fig. 3;

Fig. 5 is a detail sectional view illustrating the manner of mounting the insulating bushing in the end wall of the toaster, and Fig. 6 is a detail section illustrating another manner of locking the retaining wire in place.

Figure 1:
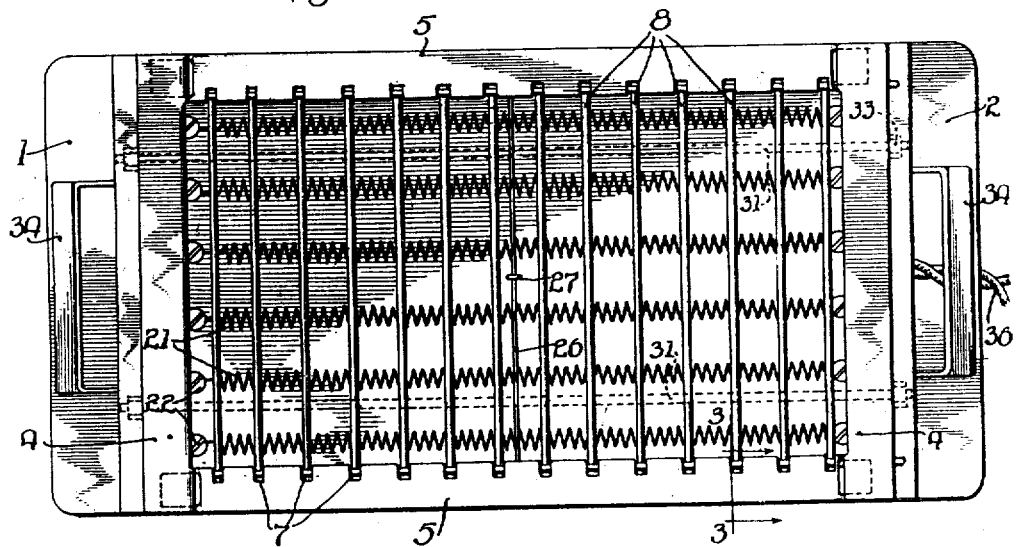
Figure 1 is a plan view of my improved toaster.
Figure 2:
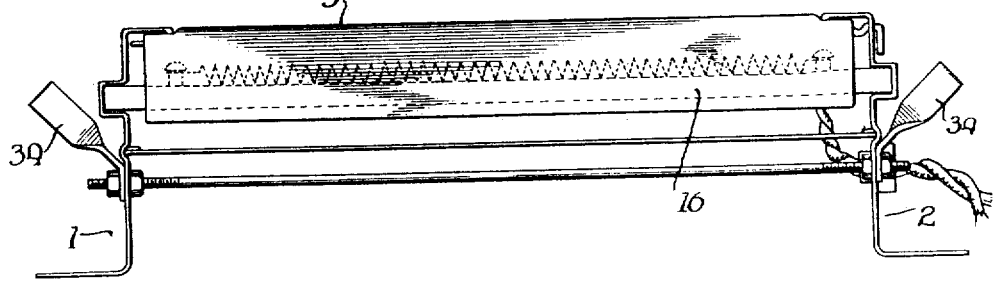
Fig. 2 is a side elevational view of the same.

The toaster frame, which is oblong in formation, comprises two end standards 1 and 2 constructed of sheet metal plates of identical formation, extending across the entire width of the frame and stamped out in the formation illustrated. This formation can best be seen in Fig. 4, from which it will be noted that the lower end of the standard has an outwardly turned base flange 3, upon which the device rests, and at its upper end is formed with an inwardly turned marginal flange 4. The two end standards are connected together at their upper ends by side members 5—5, which join with the marginal flanges 4—4 to complete the open frame of the grid surface. These side members 5—5, are constructed of sheet metal stampings both of identical formation, which are formed with an inverted channel configuration, as clearly shown in Fig. 3. The inner flange 6 is slotted out at intervals along the channel, as indicated at 7, for receiving the plurality of transverse grid wires 8. In the formation of each slot 7, the metal is punched down from the web 9 as well as inwardly from the flange 6, so that the slot 7 extends inwardly a short distance across the upper surface of the channel member 5. In punching the slot the metal is sheared free at the lower end of the slot in the flange 6 and is bent inwardly so as to project downwardly into the channel in the form of a tongue 11. The ends of the grid wires 8 abut the tongues or lugs 11 in their respective slots, whereby these tongues or lugs function to confine the grid wires against longitudinal shifting motion or play in their slots. The grid wires 8 are locked in the slots 7 by a longitudinal locking rod or wire 12 which is extended through each channel member 5 from end to end thereof, at a point between the inner flange 6 and tongues 11 and directly over the ends of the grid wires 8. These locking rods may be easily and quickly withdrawn in order to permit the release of the grid wires 8, as I shall presently describe.

The ends of the side channel members 5 are preferably connected to the marginal flanges 4 of the end standards through the provision of an integral tongue 14 projecting from the marginal flange 4, which tongue is adapted to enter a slot 15 in the channel member and be bent over and locked in place under the same. Thus the joining of the side channel members to the end standards is entirely a punching operation, which is conducive to rapid and inexpensive assembly. The slot 15 is punched in the web 9, of the channel member, and the extending portion of the web between the slot and the end of the channel is relieved or stamped downwardly in order to make the upper surface of the marginal flange 4 lie flush with the upper surface of the side channels 5. The outer flange 16 of each side channel is made considerably longer than the inner flange 6, so as to extend down and close off the sides of the space in which the heating elements are disposed and to embrace the lateral edges of the asbestos board 18, upon which the heating elements are mounted. The board or plate 18 is preferably of a commercial grade of composition asbestos board of heavy stiff construction. The board 18 is supported at each end in a channel-shaped depression 19, which is stamped outwardly in the body of the sheet metal standard. The heating elements consist of long heating coils 21 of resistance wire, which are supported above the asbestos board 18. The ends of these coils are fastened to individual binding posts consisting of screws 22 extending down through the asbestos board 18. On the under side of the board these screws have electrical connection with each other through short cross links or straps 23, these links or straps connecting adjacent pairs of screws in alternating sequence at each end of the asbestos board so as to establish a series connection through the several heat-elements, as will be apparent to one skilled in the art. Nuts 24 serve to fasten the links 23 to the binding posts and to secure the binding posts in the asbestos board, the posts being rigidly secured in the board by threading into the same or by the provision of a spacing sleeve 25 between the board and the head of the screw. The heating coils of resistance wire have a tendency to sag when they are heated, and to support these coils out of contact with the asbestos board at all times there is provided a transverse mica bridge 26, consisting of a narrow strip of mica set up vertically on the asbestos board and fastened thereto by a staple 27 or any other suitable means. The heating coils rest at their intermediate points on this mica bridge. The extension of the outer flanges 16 of the side channel down below the asbestos board 18 has the two-fold function of excluding the air and confining the heat of the outermost heating coils, whereby all of the coils heat uniformly, and of confining the asbestos board 18 against lateral displacement. If desired, the ends of the channel formations 19 in the standards 1 and 2 may be formed with metal tabs for bending over the ends of the channels and locking the asbestos board in this manner.

Below the asbestos board 18 is a sheet metal plate 27 of substantially the width of the toaster frame, the ends of this sheet metal plate being folded back upon themselves as indicated as 28, and setting into beaded grooves 29 which are stamped in the sheet metal standards 1 and 2. The plate 27 is rigidly held in the grooves 29 under the tension imposed by two tie rods 31—31 which extend between the end standards 1 and 2 directly below the plate 27. The plate 27 serves to prevent accidental contact with the electrical connections on the bottom of the asbestos board 18, prevents the downward radiation of heat to the top of the table, and also functions to stiffen the frame of the toaster. The tie-rods are extended through holes in the end standards 1 and 2, and are threaded at their ends for the reception of nuts 32 and 33 which engage on the inner and outer sides of the standards respectively. The toaster is provided at each end with handles 34—34, which are preferably constructed of sheet metal strips bent into the conformation illustrated in Figs. 1 and 4. The ends of the handles 34 are bent down in the form of straps 35, which are apertured to engage over the ends of the tie rods 31. The nuts 33 thread over the ends of the tie rods on the outside of these straps 35 and thus rigidly clamp the handles 34 and to the end standards of the frame. The electric cord 36 for conducting current to the device is extended through an insulating bushing 37 in the wall of the end standard 2. This insulating bushing may be composed of rubber, porcelain, or any other insulating material, preferably of porcelain, however; and as clearly shown in Fig. 5, this bushing is formed with a reduced shank 37 which is extended through a hole in the standard 2 and by which the bushing is rigidly retained in place. The washer 39, which in its original form is cupped outwardly in conical form as indicated by the dotted lines, is slipped over the reduced shank 38. In its original conical form the bore of the washer has a snug sliding fit over the shank 38. The washer is then stamped or compressed against the wall of the standard 2 into substantially flat form, as indicated in full lines, whereby the bore of the washer is firmly contracted about the shank of the bushing by the crowding of the metal inwardly around the shank. In this manner the bushing is rigidly mounted in the standard without necessitating any threaded connections or the like. The electric cord 36 is extended up through an aperture in the plate 27 and has connection with the bind posts 22 in an obvious manner.

The locking rods 12, which lock the grid wires 8 in place, are extended out at one end through the wall of the standard 2 so as to permit of their being withdrawn when it is desired to remove the grid wires 8 for the substitution of a burned-out heating element 21. The locking rods are extended through holes 41 in the end wall of the standard, and have their ends turned downwardly, as indicated at 42, so as to lie substantially flush with the outer surface of the standard. To prevent the rods from sliding out when the toaster is tilted, they are formed with locking humps 43, which normally retain the rods in place, but which may be manipulated to pass through the holes 41. It will be apparent that by the present manner of retaining the grid wires in position through the provision of the releasable locking rods 12, the grid wires may be quickly and conveniently removed from the frame to afford ready access to the heating elements 21 for their substitution, without in any manner necessitating the disassembly of the toaster frame. In Fig. 6, I have illustrated a modified construction, wherein the locking rods 12 are permanently inserted in the channel members 5 and are not removable therefrom. In this form the rods are inserted into the channels through holes 41' which are formed in the walls of the standard by punching outwardly short tongues of metal 44. After the rods are inserted into the channels, the tongues 44 are bent back into the openings 41' thereby securing the rods in the channels.

I do not intend to be limited to the particular details shown and described except as they are defined in the appended claims.

I claim:

1. In a toaster, the combination of a toasting surface comprising an open frame and having a heating element, a plurality of grid sections extending across said frame, and means for removably securing said grid sections to said frame, said means permitting the removal of said grid sections independently of said heating element.

2. In a toaster, the combination of a toasting frame comprising side and end members, a plurality of wire grid sections extending across said frame and supported thereon, a heating element, and releasable locking means coöperating with said grid sections for permitting their ready removal from said frame independently of said heating element.

3. In a toaster, the combination of end standards, a toasting frame supported on said standards, said toasting frame comprising two side rails having a plurality of recesses formed therein, a plurality of grid wires having their ends supported in said recesses, and releasable locking rods extending through said side rails and locking said grid wires in said recesses.

4. In a toaster, the combination of a pair of end standards, a pair of spaced side rails joining said standards, said side rails being of channel formation and having a plurality of slots cut in the inner wall thereof, a plurality of grid wires having their ends resting in said slots, means for confining the longitudinal motion of said grid wires in said slots, and a locking rod extending through each of said channel rails and above the ends of said grid wires for retaining the latter in said slots.

5. In a toaster, the combination of two end standards, a pair of spaced side channels joined to said end standards and defining therewith an open toasting frame, said side channels having an inner vertical flange and a horizontal web, a plurality of slots punched in said inner flange and said web, a plurality of parallel grid wires having their ends resting in said slots, said slot forming vertical tongues projecting down into said channel, the ends of said grid wires being adapted to abut said tongues, and locking wires extending longitudinally through said side channels between the ends of said grid wires and the web of each channel for retaining said grid wires in position.

6. In an electric toaster, the combination of end standards, a pair of spaced side rails connected to the upper ends of said standards, a surface of heat insulating material supported between said end standards, a plurality of electrical heating elements mounted on said heat insulting surface, a grid structure supported by said side rails, and flanges on said side rails extending below and embracing said heat insulating surface for confining the heat of said elements.

7. In a toaster, the combination of end standards, a pair of parallel side channels connected to the upper ends of said end standards and defining therewith an open toasting frame, said side channels comprising inner and outer vertical flanges, a heat insulating board supported between said end standards, a plurality of electrical heating elements mounted on said board, the inner flanges of said side channels having slots provided therein, a plurality of grid wires supported in said slots, the outer flanges of said side channels extending to a point substantially even with or below the surface of said heat insulating board for confining the heat of said elements.

8. In an electric toaster, the combination of two end standards, a shoulder formed at an intermediate point on each of said standards for supporting a heat insulating board, the upper ends of said end standards being formed with marginal flanges, a pair of side rails connected to the ends of said marginal flanges, a plurality of spaced grid wires, said side rails comprising means for supporting the ends of said grid wires, and electric heating elements mounted on said heat insulating board.

9. In an electric toaster, the combination of two end standards, a pair of side members secured to the upper ends of said standards and forming an open frame, a grid surface supported in said frame, and an electric heating element supported below said grid surface.

10. In an electric toaster, the combination of a pair of end standards, each of said standards consisting of a sheet metal stamping extending substantially across the width of the toaster, a flange at the upper end of each of said standards, a pair of side rails secured to said flanges and defining therewith an open frame, a grid surface supported in said frame, a heat refractory plate supported below said grid surface, and electric heating elements on said heat refractory plate.

11. In an electric toaster, the combination of two end standards extending substantially across the entire width of the toaster, a channel depression at an intermediate point in each of said standards, an asbestos board supported in said channel depressions, a marginal flange formed at the upper end of each of said standards, a pair of side rails secured to the corners of said marginal flanges, a plurality of grid wires supported in the frame defined between said side rails and said marginal flanges, a plurality of electric heating elements on said asbestos board, and a plate supported below said asbestos board.

12. In an electric toaster, the combination of two end standards, each consisting of a single sheet metal stamping extending substantially across the end of said toaster, a marginal flange at the upper end of each of said standards, a pair of side rails secured to the ends of said marginal flanges, each of said side rails consisting of a sheet metal stamping of channel formation, a plurality of slots cut in said side rails, grid wires supported in said slots, a channel depression in each of said standards, an asbestos board supported in said channel depressions, electric heating elements mounted on said asbestos board, a plate below said asbestos board supported by said end standards, and tie-rods extending between said end standards.

13. In an electric toaster, the combination of a toaster frame, heating elements carried by said frame, an electric conductor for connecting said heating elements, an insulating bushing in said frame for receiving said conductor, said insulating bushing comprising a shank extending through an aperture in said frame, and a conical washer engaging over said shank, said conical washer being compressed whereby its bore is contracted about said shank.

14. In a device of the class described, the combination of a frame member, an insulating bushing extending through an aperture in said frame member, said bushing comprising a head and a reduced shank, the head of said bushing engaging with one wall of said frame member and the shank of said bushing projecting from the other wall thereof and a tapered washer engaging over said reduced shank, said tapered washer being compressed whereby the bore of said washer is tightly contracted about said shank.

15. In an electric toaster a pair of similar end standards each having a hook formed on each side thereof, and a pair of side members, each having an opening at each end thereof in which the adjacent hook has interlocking engagement.

16. In an electric toaster, a pair of similar end standards each having two channels formed therein, a heat insulating board supported in the upper pair of channels, a metal plate supported in the lower pair of channels, and a tie rod securing said standards together.

17. In an electric heating device, the combination of a body structure, a heating element supported thereby, a grid surface coöperating with said heating element, and means supporting said grid surface on said body structure and arranged whereby said grid surface can be readily displaced from its normal position independently of said heating element for affording convenient access to said heating element.

18. In a device of the class described, the combination of a frame, having means for supporting the same on a table or the like, electrical heating means supported by said frame, and grid means supported by said frame and coöperating with said heating means, one of said latter means being readily removable from said frame independently of the other.

In witness whereof I hereunto subscribe my name this 29th day of June, 1920.

EMIL A. CHRISTOPH.